(12) United States Patent
De Lange et al.

(10) Patent No.: US 6,586,540 B1
(45) Date of Patent: Jul. 1, 2003

(54) METHOD FOR PRODUCING AN ETHYLENE COPOLYMER

(75) Inventors: Paulus De Lange, Wesseling (DE); Volker Billert, Ebertsheim (DE); Bernd Brunner, Erpolzheim (DE); Werner Ritter, Carlsberg (DE); Andreas Deckers, Flomborn (DE)

(73) Assignee: Basell Polyolefine GmbH, Kehl (DE)

( * ) Notice: Subject to any disclaimer, the term of this patent is extended or adjusted under 35 U.S.C. 154(b) by 0 days.

(21) Appl. No.: 09/889,607

(22) PCT Filed: Mar. 14, 2000

(86) PCT No.: PCT/EP00/02234

§ 371 (c)(1),
(2), (4) Date: Jul. 19, 2001

(87) PCT Pub. No.: WO00/56776

PCT Pub. Date: Sep. 28, 2000

(30) Foreign Application Priority Data

Mar. 22, 1999 (DE) .......................... 199 12 855

(51) Int. Cl.[7] .............................................. C08F 210/16
(52) U.S. Cl. ............................ 526/74; 526/59; 526/60; 526/90; 526/160; 526/124.2; 526/348.2; 526/348.5; 526/348.6
(58) Field of Search ................ 526/74, 59, 60

(56) References Cited

U.S. PATENT DOCUMENTS 5,071,927 A * 12/1991 Benham et al. ............... 526/64
5,352,658 A 10/1994 Evertz et al. ............... 502/107
5,627,242 A 5/1997 Jacobsen et al. ............... 526/60

FOREIGN PATENT DOCUMENTS

| EP | 0 095 848 | 12/1983 |
| EP | 0 555 747 | 8/1993 |
| EP | 0 848 021 | 6/1998 |
| EP | 0 848 021 A2 * | 6/1998 |

* cited by examiner

Primary Examiner—Bernard Lipman
Assistant Examiner—R. Rabago
(74) Attorney, Agent, or Firm—James C. Lydon

(57) ABSTRACT

The invention relates to a method for the production of copolymer based on ethylene by continuous copolymerization of ethylene and comonomer in a reactor in the presence of a catalyst. In this method, in a first step of the copolymerization, a mixture comprising ethylene and comonomer of such a composition that a copolymer-containing coating deposits in the reactor is metered into the reactor and/or generated in the reactor, and, in a second step, the concentration of the comonomer in the metered-in mixture and/or in the mixture generated in the reactor is reduced sufficiently and/or the concentration of the ethylene in the metered-in mixture and/or in the mixture generated in the reactor is increased sufficiently that the coating is removed from the reactor either partially or completely. The method has the advantage that the production of copolymer does not have to be interrupted during cleaning of the reactor.

13 Claims, No Drawings

METHOD FOR PRODUCING AN ETHYLENE COPOLYMER

This application is a U.S. National Stage of International Application PCT/EP00/02234, filed on Mar. 14, 2000 and published on Sep. 28, 2000 in the German language.

The invention relates to a method for producing a copolymer based on ethylene.

Polyethylenes are produced by polymerization of ethylene by two basically different methods, the high-pressure process and the low-pressure/medium-pressure process. The low-pressure/medium-pressure process can be carried out as a solution polymerization, as a suspension/emulsion polymerization or as a gasphase polymerization. The high-pressure process is carried out at pressures higher than 1500 bar and proceeds by a free-radical mechanism.

In general, the low-pressure/medium-pressure process is carried out at pressures below 100 bar and is in general catalyzed. In contrast to the products from the high-pressure process, which have a high degree of branching, lower crystallinity and low density, products from the low-pressure/medium-pressure process usually have a linear, less highly branched structure, have high crystallinity (usually 60–90%), a high melting range (typically 120–135° C.) and high density (usually 0.93–0.97 g/cm$^3$). A high density of the polyethylenes is generally associated at the same time with a high glass transition temperature, high hardness, a high melting range, high brittleness and low tack. The above properties generally distinguish the low-pressure/medium-pressure polyethylene.

Since these properties are frequently not technically desired, it is being attempted to reduce the crystallinity of corresponding polyethylenes. This is carried out, for example, by metering small amounts—in general less than 5 mol %—of olefins (comonomers apart from ethylene) into the monomer ethylene, which is subsequently copolymerized with the metered-in olefins. The resultant olefin structural units in the polymer chain increase the disorder in the structure and thus cause lower crystallinity of the polymer. The resultant copolymer, which essentially consists of ethylene structural units, thereby becomes less brittle and can thus be produced more easily for many purposes.

The low-pressure/medium-pressure polymerization of ethylene in which olefins are employed as comonomer will be considered below. This is a copolymerization in which, through variation of the amount of olefin in the monomer mixture, the crystallinity of the resultant product can be controlled. EP-B-0 555 747 describes such a copolymerization of ethylene with comonomer. In the corresponding method, ethylene is polymerized catalytically with α-olefins at pressures below 100 bar.

However, a basic problem occurs in these copolymerizations since, as described in the introduction, the admixture of olefins to the monomer mixture to be polymerized reduces the crystallinity of the resultant polymer product and thus increases its tack and solubility. A frequent consequence is that, in particular in the case of copolymerizations in which a high proportion of comonomer is employed, the reactor used becomes clogged with polymer. Coatings of ethylene copolymer form. These may deposit both in the polymerization reactor and in the discharge zone of the reactor. In particular in narrowed regions of the reactor or in the discharge system of the reactor, blockages can thus easily occur. In practice, corresponding plants, which are generally operated continuously, have to be cleaned regularly. This means that the entire production has to be stopped in order to remove the coatings. The interruption of production means lower occupancy times of the reactor used, thus a fall in production and thus financial consequences.

The present invention has the object of providing a method in which the polyethylene production plant no longer has to be shut down in order to remove coatings. The aim is to remove the interfering coatings during production.

The method according to the invention is then a method for the production of copolymer based on ethylene by continuously operated copolymerization of ethylene and comonomer in a reactor in the presence of a catalyst, where, in a first step of the copolymerization, a mixture comprising ethylene and comonomer of such a composition that a copolymer-containing coating deposits in the reactor is metered into the reactor and/or generated in the reactor, and, in a second step, the concentration of the comonomer in the metered-in mixture and/or in the mixture generated in the reactor is reduced sufficiently and/or the concentration of the ethylene in the metered-in mixture and/or in the mixture generated in the reactor is increased sufficiently that the coating is removed from the reactor either partially or completely.

For the purposes of present invention, the term reactor is taken to mean, inter alia, the entire section of the production apparatus in which the copolymer is able to deposit. This may also be, in particular, the discharge zone of a reactor in which, although the actual polymerization does not take place, polymer is deposited—in particular pipelines are affected by this (the reactor usually contains a production zone and a discharge zone). The comonomer employed in the copolymerization can be one or more species simultaneously. Particularly suitable comonomers are α-olefins, such as butene and/or hexene and/or octene. In principle, however, all alkenes (apart from ethylene) can be employed—including cycloolefins and higher alkenes. If no comonomer is present in the reactor during the second step, owing to the omission of metering-in of comonomer, pure polyethylene can also be generated. In a preferred embodiment, the performance of the second step is only begun when the free internal cross-sectional area of the reactor has first been reduced by at least 5% at any desired point owing to the deposition of polyethylene copolymer-containing coating. In this case, the space-time yield of the method is already significantly reduced and/or there are signs of blockages. In order to prevent damage of this type, the second step is then initiated specifically.

The polymer produced in the first step is softer, has a lower density and is tackier than the product from the second step, which already has a high degree of crystallization. The copolymer produced in step 1 generally has ball indentation hardnesses of from 30 to 50 MPa, preferably from 32 to 42 MPa. The basic standardized determination method for the ball indentation hardness is: (H 132/90): ISO/IEC 2039/1. In step 2, copolymer which has ball indentation hardnesses of greater than 50 NPa is frequently generated.

In general, the duration of step 1 and/or step 2 varies. The smaller the diameter of the discharge lines or the product valves, the more frequently phase 2 has to be initiated. In the case of production units, one step can last from a number of days to a number of weeks. In principle, however, considerably longer and/or shorter times are also possible in this respect. In general, step 2 immediately follows step 1. If the two steps are carried out alternately, step 2 usually immediately follows step 1 and/or step 1 immediately follows step 2. Intermediate steps, for example flushing with inert gas or rinsing with pure dispersion medium, are, however, in principle also possible. At least one further step is then carried out between step 1 and step 2 and/or between step 2 and step 1.

The copolymer-containing coating formed in the copolymerization usually comprises at least 95% by weight of copolymer. Catalyst, for example, may be present in the coating as an impurity.

The suitable catalysts are preferably catalysts for the production of polyolefins, in particular Ziegler, Phillipps or metallocene catalysts. Phillips catalysts are generally employed in supported form. Phillips catalysts are generally chromium catalysts, which, besides chromium, may also contain other elements, such as, for example, molybdenum, tungsten, magnesium or zinc. Particularly suitable support materials for Phillips catalysts are inorganic compounds, in particular porous oxides, such as $SiO_2$, $Al_2SiO_3$, MgO, $ZrO_2$, $B_2O_3$, CaO, ZnO or mixtures of these oxides. The support materials preferably have a particle diameter of between 1 and 300 μm, in particular from 30 to 70 μm. Particularly preferred supports are silica gels and aluminosilica gels. As mentioned above, metallocene catalysts may also be employed. In particular, use is made here of supported systems in which suitable support materials are preferably finely divided solids based on silica gels. Examples of particularly suitable complex compounds of the metallocenes are, inter alia, dimethylsilanediylbis (cyclopentadienyl)zirconium dichloride, dimethylsilanediylbis(2-methylindenyl)zirconium dichloride, [2,6-diacetylpyridinebis(2,6-diisopropylphenylimine)]iron(II) chloride, [2,6-diacetyl-4-trifluoro-methylpyridinebis((2,6-diisopropyl)phenylimine)]cobalt(II) chloride, [1,4-die(2,6-diisopropylphenyl)2,3-dimethyldiazylbutadiene]palladium (II) dichloride or [1,4-di(2,6-diisopropylphenyl)2,3-dimethyldiazylbutadiene]nickel(II) dichloride.

The copolymerization can be carried out, in particular, as a suspension, gas-phase or solution polymerization. Correspondingly, a dispersion medium, a fluidizing gas or a solvent then has to be employed for the copolymerization method. Suitable reactors for the continuous copolymerization method are, in particular, cascade, loop or tubular reactors. In general, the copolymerization is carried out at pressures below 100 bar. The temperature in the reactor is usually lower than the melting point or melting range of all the copolymer present in the reactor.

Soft and hard copolymer is thus alternately generated in the method according to the invention, with softer copolymer being generated in the first step than in the second step. The generation of harder polymer removes the coatings. Hard "material" is transported in the continuous process and rubs against the reactor walls coated with the coatings. Since adhering coatings are removed from the reactor as it were during production, it is not necessary to shut down the production process in order to eliminate coatings. Owing to the consequent better plant availability, the economic efficiency of the process is greatly improved. Both the polymer produced during the first step and the polymer produced during the second step are generally desired target products.

It is in principle possible for the two above-mentioned steps to be carried out alternately as often as desired, so that soft and hard copolymer is generated alternately.

The method according to the invention is explained in greater detail below with reference to a working example.

An example carried out in accordance with the method according to the invention and a comparative example of a copolymerization are described below. The copolymerization is in each case carried out in a 180 l loop reactor and is in each case carried out as a suspension polymerization, with the dispersion medium employed being isobutane. The pressure during the copolymerization is in each case 40 bar. The diameter of the discharge line from the loop reactor is reduced and is in each case 25 mm. Further reaction parameters and the starting-material concentrations present in the reactor are shown in the following table:

| Product | HLMI (g/10 min) | Density (g/ml) | Hardness (MPa) | Ethene (% by vol.) | Hexene (% by vol.) | Temperature (° C.) |
|---|---|---|---|---|---|---|
| MD 1 | 25 | 0.9361 | 34 | 10.2 | 3.6 | 94.2 |
| HD 2 | 25 | 0.9561 | 51 | 12.3 | 0.3 | 104.3 |

Catalyst: 1% by weight of Cr on silica gel; remaining gas volume $N_2$; HLMI (high load melt index - measured in accordance with ISO 1133); density; (measured in accordance with ISO 183); hardness: corresponds to the ball indentation hardness (standardized measurement method, see comments above).

EXAMPLE

In step 1, a polyethylene copolymer of type MD 1 (see above table) is produced. After a polymerization time of 70 hours, step 1 is terminated and step 2 is initiated by reducing the hexene concentration. The hexene concentration is reduced here from 3.6 to 0.3% by volume. In step 2, the polymer HD 2 is thus produced (see above table). During step 2, i.e. the metering-in of an ethene/hexene mixture having a lower content of hexene, a coating which had formed in the discharge line during step 1 is removed from the reactor. The removal of the coating takes about 24 hours, after which it is possible to re-initiate step 1 by increasing the hexene content in the starting mixture again. Cleaning of the discharge lines is unnecessary in this method.

COMPARATIVE EXAMPLE

The method on which the comparative example is based is carried out in accordance with the above experiment—only step 2 is omitted. Polymer of type MD 1 is exclusively produced. After a run time of 76 hours, the plant had to be shut down, since it was no longer possible to discharge product through the 25 mm discharge line of the loop reactor. The plant was blocked and had to be cleaned.

What is claimed is:

1. A method for producing a copolymer based on ethylene having a density of greater than or equal to 0.936 g/cm$^3$ by continuous copolymerization of ethylene and comonomer in a reactor at temperatures of greater than or equal to 94.2° C. in the presence of a catalyst, where, in a first step of the copolymerization, a mixture comprising ethylene and comonomer of such a composition that a copolymer-containing coating deposits in the reactor is metered into the reactor and/or generated in the reactor, and, in a second step, the concentration of the comonomer in the metered-in mixture and/or in the mixture generated in the reactor is reduced and/or the concentration of the ethylene in the metered-in mixture and/or in the mixture generated in the reactor is increased, with the coating being removed from the reactor either partially or completely, even from narrowed regions of the reactor and a discharge system.

2. The method of claim 1, wherein the performance of the second step is only begun when the free internal cross-sectional area of the reactor has previously been reduced by at least 5% at any desired point due to deposition of said copolymer-containing coating.

3. The method according to claim 1, wherein copolymer produced in step 1 has a ball indentation hardness of from 30 to 50 Mpa.

4. The method according to claim 3, wherein copolymer produced in step 1 has a ball indentation hardness of from 32 to 42 Mpa.

5. The method according to claim 1, wherein step 2 immediately follows step 1 and/or step 1 immediately follows step 2.

6. The method of claim 1, wherein at least one further step is carried out between step 1 and step 2 and/or between step 2 and step 1.

7. The method of claim 1, wherein the copolymerization is selected from the group consisting of suspension polymerization, gas-phase polymerization and solution polymerization.

8. The method of claim 1, wherein said comonomer is at least one member selected from the group consisting of butene, hexene and octene.

9. The method of claim 1, wherein a catalyst used in the copolymerization is a member selected from the group consisting of Ziegler catalysts, Phillips catalysts and metallocene catalysts.

10. The method of claim 1, wherein the copolymerization is performed at a pressure below 100 bar.

11. The method of claim 1, wherein a temperature in the reactor is lower than a melting point or a melting range of all the copolymer present in the reactor.

12. The method of claim 1, wherein a duration of step 1 and/or step 2 varies.

13. The method of claim 1, wherein said copolymer-containing coating comprises at least 95% by weight of copolymer.

* * * * *

UNITED STATES PATENT AND TRADEMARK OFFICE
CERTIFICATE OF CORRECTION

PATENT NO.    : 6,586,540 B1                                         Page 1 of 1
DATED         : July 1, 2003
INVENTOR(S)   : Paulus De Lange et al.

It is certified that error appears in the above-identified patent and that said Letters Patent is hereby corrected as shown below:

<u>Column 4,</u>
Line 56, change "and a discharge" to -- and from a discharge --.

Signed and Sealed this

First Day of June, 2004

JON W. DUDAS
*Acting Director of the United States Patent and Trademark Office*